US008406014B2

(12) United States Patent
Liu et al.

(10) Patent No.: US 8,406,014 B2
(45) Date of Patent: Mar. 26, 2013

(54) CIRCUIT FOR ADJUSTING THE OUTPUT VOLTAGE FOR A RESONANT DC/DC CONVERTER

(75) Inventors: Zhiyu Liu, Shenzhen (CN); Chunhui Zhu, Shenzhen (CN); Haizhou Zhao, Shenzhen (CN)

(73) Assignee: Emerson Network Power Energy Systems, North America, Inc., Lorain, OH (US)

( * ) Notice: Subject to any disclaimer, the term of this patent is extended or adjusted under 35 U.S.C. 154(b) by 263 days.

(21) Appl. No.: 12/087,278

(22) PCT Filed: Dec. 29, 2006

(86) PCT No.: PCT/CN2006/003697
§ 371 (c)(1),
(2), (4) Date: Feb. 5, 2009

(87) PCT Pub. No.: WO2007/076702
PCT Pub. Date: Jul. 12, 2007

(65) Prior Publication Data
US 2009/0218994 A1    Sep. 3, 2009

(30) Foreign Application Priority Data
Dec. 30, 2005    (CN) .......................... 2005 1 0003362

(51) Int. Cl.
*H02M 3/335* (2006.01)
(52) U.S. Cl. .................. 363/21.02; 363/98; 363/132
(58) Field of Classification Search .............. 363/17,
363/21.02, 21.03, 97, 98, 132, 21.1, 21.11,
363/21.18
See application file for complete search history.

(56) References Cited

U.S. PATENT DOCUMENTS

| 6,100,675 | A  | * | 8/2000 | Sudo ............................. 323/282 |
| 6,366,070 | B1 | * | 4/2002 | Cooke et al. .................. 323/284 |
| 6,366,476 | B1 | * | 4/2002 | Yasumura .................. 363/21.02 |
| 6,898,091 | B2 | * | 5/2005 | Van Bodegraven et al. ......................... 363/21.02 |

(Continued)

FOREIGN PATENT DOCUMENTS

| CN | 1220515 A | 6/1999 |
| CN | 1595780 A | 3/2005 |
| CN | 1885699   | 12/2006 |

OTHER PUBLICATIONS

International Search Report for International Patent Application No. PCT/CN2006/003697, dated Apr. 5, 2007.

*Primary Examiner* — Adolf Berhane
*Assistant Examiner* — Fred E Finch, III
(74) *Attorney, Agent, or Firm* — Harness, Dickey & Pierce, P.L.C.

(57) ABSTRACT

A method and circuit for controlling a resonant DC/DC converter which adjusts an output voltage by changing a turn-on frequency of input switch devices of a resonant circuit of the converter. The method extends the range of the output voltage of the resonant circuit by adjusting the duty ratio of the switch devices based on the feedback signal of the load circuit. The method and circuit uses two modes to control resonance of the DC/DC converter-frequency modulation and frequency modulation plus pulse width modulation. Frequency modulation is used when the operating frequency of the power supply is low. Frequency modulation plus pulse width modulation is used when the operating frequency of the power supply is too high.

14 Claims, 4 Drawing Sheets

U.S. PATENT DOCUMENTS

| | | | |
|---|---|---|---|
| 6,912,137 B2* | 6/2005 | Berghegger | 363/21.03 |
| 7,227,763 B1* | 6/2007 | Noh et al. | 363/56.02 |
| 2005/0052249 A1 | 3/2005 | Gan et al. | |
| 2005/0152159 A1* | 7/2005 | Isurin et al. | 363/17 |
| 2005/0157522 A1* | 7/2005 | Osaka | 363/21.02 |
| 2006/0013021 A1* | 1/2006 | Aso | 363/21.09 |
| 2006/0033483 A1* | 2/2006 | Wu | 323/282 |
| 2007/0297199 A1* | 12/2007 | Sauerlander et al. | 363/21.02 |

\* cited by examiner

CIRCUIT FOR ADJUSTING THE OUTPUT VOLTAGE FOR A RESONANT DC/DC CONVERTER

CROSS-REFERENCE TO RELATED APPLICATIONS

This application is a 371 U.S. National Stage of International Application No. PCT/CN2006/003697, filed Dec. 29, 2006. This application claims priority to Chinese Patent Application No. 200510003362.7, filed Dec. 30, 2005, which application is herein expressly incorporated by reference.

FIELD OF THE INVENTION

The present invention relates to DC power supply converting technique, and more particularly, to a resonant DC/DC converter and a method for controlling the same.

BACKGROUND OF THE INVENTION

At present, miniaturization and high-frequency are the trend of development of power supplies. However, the increase of switching frequency will result in the significant losses in the switch device. This can not be resolved by the conventional buck converter, while a resonant converter can resolve this problem properly.

Taking the series resonant converter as an example, the series resonant DC/DC converter adopts resonant converting technique. As the resonant element operates at the sine resonant state, the voltage across the switch device is naturally cross-zero, thereby realizing zero-voltage turn-on, and very small loss of the power supply. This topology usually utilizes pulse frequency modulation (PFM) mode, stabilizing the output voltage by changing the operating frequency. FIG. 1 is the basic form of the half-bridge DC/DC series resonant converter (SRC). When the circuit is controlled in PFM mode, the two switch devices S1, S2 are complementary symmetrically driven, and are respectively turned at 50% of the switching cycle. This is a desirable value, and should be slightly smaller than 50% in consideration of setting the dead zone. The relationship between the gain of the output voltage of the power supply M and the operating frequency f is:

$$M = \frac{V_O}{V_{in}} = \frac{0.5}{Q_S \left| \frac{f}{f_r} - \frac{f_r}{f} \right|} \quad (1)$$

Wherein $V_o$ and $V_{in}$ are, respectively, the output voltage and the input voltage, f is the operating frequency, $$f_r = \frac{1}{2\pi\sqrt{Lr \cdot Cr}}, \quad Q_S = \frac{2\pi f_r L_r P_o}{U_o^2},$$

$f_r$ is the resonant frequency, $L_r$ is the resonant inductance, $C_r$ is the resonant capacitance, and $P_o$ is the output power.

As seen from equation (1), when the operating frequency f is larger than the resonant frequency $f_r$, a higher operating frequency results in a lower voltage gain M. Likewise, when the operating frequency f is less than the resonant frequency $f_r$, a lower operating frequency results in a lower voltage gain M. The curve of FIG. 2 demonstrates the relationship between the controlling frequency f and the output voltage $V_o$. As seen from FIG. 2, the output voltage is less stable under light load and non-load conditions. When the controlling frequency is greater than the resonant frequency $f_r$, the output voltage of the series resonant topology decreases as the controlling frequency continues to increase. The output voltage tends to be smooth when the load decreases to a light load state. Therefore, the operating frequency needs to significantly increase in order to stabilize the voltage. However, a broad range of operating frequencies will present challenges in optimizing the magnetic device. Higher operating frequencies can increase the loss of the circuit. In addition, when the load is close to non-load, the output voltage may rise instead, thereby presenting challenges to control negative feedback. Accordingly, in the power supply industry, designers may adopt a fixed load at the output in order to stabilize the output voltage under light load and non-load conditions. However, this operation may increase non-load loss and decrease the efficiency of the power supply.

Pure pulse frequency control will result in an overly broad range of operating frequencies, even failure, and make optimization of the magnetic device difficult and cause large circuit losses. This may result in difficulty designing feedback control. Therefore, simple frequency modulated control does not provide the desired voltage stability at light load or non-load conditions.

The above-described conditions of frequency modulated control have been described in connection with a half bridge series resonant circuit. A full-bridge series resonant circuit is subject to the same conditions as that of the half-bridge series resonant circuit. In theory, there are similar problems in all frequency modulation control resonant circuits.

SUMMARY OF THE INVENTION

The present disclosure provides a method for controlling a resonant DC/DC converter and an apparatus therefore to enable variable frequency control in either light load or non-load conditions to enable the magnetic element to be optimized for the voltage of the magnetic element to be stabilized, and to limit circuit loss.

In order to achieve the above, the present disclosure provides a method for controlling a resonant DC/DC converter which adjusts an output voltage by changing a turn-on frequency of input switch device of a resonant circuit of the converter, and extends a range of the output voltage of the resonant circuit by adjusting a duty ratio of the switch device based on a feedback signal of a load circuit.

The input switch device of the resonant circuit can be controlled by a driving pulse via a drive circuit, and acquisition of the driving pulse comprises:

1) Acquiring a feedback signal of a load circuit;
2) Determining whether a load operates at a light load or non-load state, based on the feedback signal; and
3) Using a pulse signal having a frequency and a duty ratio, both varying in accordance with a feedback signal, as a driving pulse of a drive circuit. If the load operates at a light load or non-load state, operating the resonant in a combined mode of PWM (pulse width modulation) control and PFM control, otherwise, using a pulse signal having a stable duty ratio and a frequency that varies in accordance with the feedback signal as the driving pulse of the drive circuit, thereby operating the resonant circuit operate in the PFM control mode.

Acquiring a feedback signal may further include:
1a) sampling a feedback voltage from the load circuit; and
1b) applying negative feedback compensation to the feedback voltage to obtain the feedback signal.

Selection between PFM control and PFM+PWM control is achieved by the following. In determining the state of the load, obtaining a pulse frequency control signal and a pulse width modulation signal after obtaining the feedback signal. Obtaining the feedback signal includes comparing the voltage signal with a first reference signal to determine whether the load is operating at a light load or non-load state. The first reference signal is determined according to the electrical characteristic of the load. Using a pulse signal further includes generating the driving pulse adjusted by both the pulse frequency control signal and the PWM signal when the load operates at a light load or non-load state; otherwise, generating the driving pulse adjusted by the pulse frequency control signal only while maintaining a stable duty ratio.

Various embodiments can further comprise selecting PWM control only. When determining the state of the load, comparing the voltage signal with a second reference signal to determine whether the load operates in a non-load state. The second reference signal is determined according to the electrical characteristics of the load. If it is determined that the load operates in a non-load state, it must be determined whether the load operates at a light load or non-load state based on the first reference signal. When using a pulse signal, when the load operates at a non-load state, generating a driving pulse adjusted by the PWM signal only, of which the frequency is stable.

A resonant DC/DC converter, includes:
  a drive circuit and a resonant circuit, the drive circuit controlling an input switch device of the resonant circuit based on an input driving pulse, the resonant circuit providing a converted power supply to a load circuit under the control of the drive circuit, and
  a negative feedback compensatory regulator for performing a negative feedback compensation operation of a feedback voltage sampled from the load circuit to obtain a feedback signal; and
  a discriminator for determining a load state of the load circuit based on the inputted feedback signal, and outputting a driving pulse modulation signal;
  a driving pulse generator for modulating and outputting a driving pulse based on the input driving pulse modulation signal; if the load operates at a light load or non-load state, both a frequency and duty ratio of the outputted driving pulse being adjusted as the feedback signal changes; otherwise, the duty ratio of the outputted driving pulse being stable and the frequency of the outputted driving varying as the feedback signal changes.

One various embodiment of performing PFM and PFM+PWM control of the resonant DC/DC converter utilizes two separate driving signal generating circuit modules. The driving pulse generator includes a pulse frequency control circuit and a pulse frequency control plus a pulse width modulation (PFC+PFM) circuit. If the discriminator determines that the load is operating at a light load or non-load state, the PFM+PWM circuit is provided with the driving pulse modulation signal and controlled to output a driving pulse having both a frequency and a duty ratio that vary in accordance with the feedback signal. Otherwise, the pulse frequency control circuit is provided with the driving pulse modulation signal, and controlled to output the driving pulse of which the duty ratio is stable and the frequency varies as the feedback signal changes.

Another various embodiment of performing forming the PFM and PFM+PWM control of the above-mentioned resonant DC/DC converter can use a driving signal generating circuit module. A discriminator includes a first operational circuit and a second operational circuit. The first operational circuit is provided with a first reference signal. The driving pulse modulation signal includes a pulse frequency control signal and a PWM signal. The feedback signal is output as the PWM signal after being processed and output by the first operational circuit. The feedback signal is also output as the pulse frequency control signal after being processed and output by the second operational circuit. The first reference signal is determined according to the electrical characteristics of the load. When the load operates at light-load or no-load state, the PWM signal varies in accordance with the feedback signal; otherwise, it is stable. The driving pulse generator includes a pulse frequency control circuit and a PWM circuit. The pulse frequency control circuit generates a variable frequency pulse having a frequency that varies in accordance with the pulse frequency control signal. The PWM circuit outputs the driving pulse after the PWM of the variable frequency pulse is adjusted based on the pulse width modulation signal. The PWM circuit may output the driving pulse after comparing and combining the pulse width modulation signal with the variable frequency pulse.

The variable frequency pulse may be applied to the synchronized terminal of the pulse width modulation circuit. The PWM circuit performs the PWM for the input variable frequency pulse based on the PWM signal and then outputs the driving pulse.

In order to achieve the simple PWM control at a state that is approximate to non-load state, the second operational circuit receives a second reference signal. The feedback signal is compared with the second reference signal by the second operational circuit, and the output is the pulse frequency control signal. The second reference signal is determined according to the electrical characteristics of the load, so that the output pulse frequency control signal is stable when the load operates at a state that is approximate to non-load state; otherwise, it varies in accordance with the feedback signal. If it is determined that the load operates at a state approximate to non-load state based on the second reference signal, it must be determined whether the load operates at a light load or non-load state based on the first reference signal.

The pulse frequency circuit may include a voltage controlled oscillator and a triangular wave generator connected in sequence. The pulse frequency control signal is input into the voltage controlled oscillator to control its oscillating frequency, and the triangular wave generator outputs a variable frequency pulse of which the frequency is controlled.

With the above technical solution, the present disclosure has the following advantageous technical effects:
  1) The PWM controlling mode is introduced into the controlling mode of the resonant DC/DC converter, providing the two controlling modes of PFM and PFM+PWM. The PFM controlling mode is used when the operating frequency of the power supply is relatively low, and the PFM+PWM controlling mode is introduced when the operating frequency of the power supply is relatively high. The frequency can be fixed when the frequency is higher, entering the PWM controlling mode. This resolves issues related to the operating frequency being too high and the loss of the circuit being too large in case of light load and non-load, thereby enhancing the regulation ability of the output voltage of the resonant circuit, and expanding the voltage output range effectively.
  2) The two modes PFM and PFM+PWM control modes are selectively parallel in logic and can be realized by adopting the mode that the pulse frequency control circuit and the pulse width modulation circuit are connected in series. The circuit avoids the use of many logical gate devices and the multi-channel negative feedback compensation regulators, and thus it is simple. The switching of the two controlling modes is smooth, and the reliability and the dynamic characteristic of these two modes are very good.

The present disclosure is applicable to at least a full-bridge serial or parallel connection resonant circuit, a half-bridge serial or parallel connection resonant circuit, and LLC, and so on, and it has great significance in terms of engineering.

The present invention will be described in detail in connection with the accompanying drawings and the embodiments.

DETAILED DESCRIPTION OF THE INVENTION

A method for controlling a resonant DC/DC converter is provided in which an output voltage is regulated by changing on-frequency of an input switch device in the resonant circuit. The duty ratio of the switch device is regulated based on a feedback signal from the load circuit, so that the range of output voltage of the resonant circuit is expanded.

Figure 1:
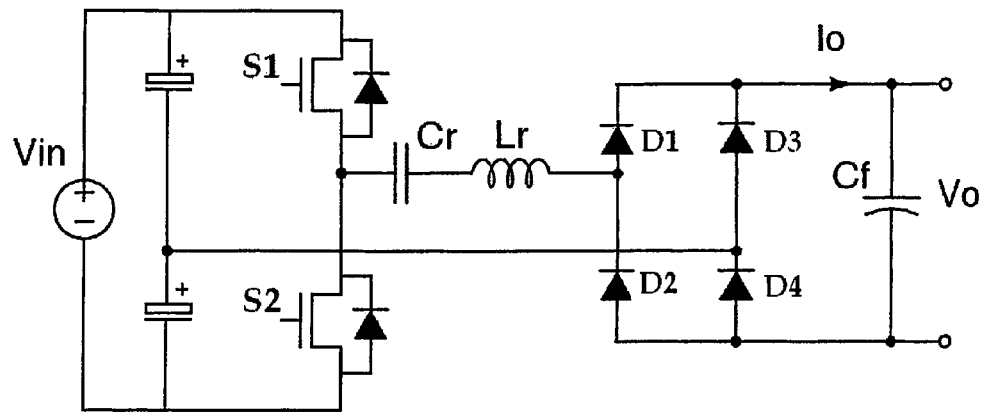
FIG. 1 is an illustrative view of a typical half bridge serial resonant circuit in the prior art.
Figure 2:
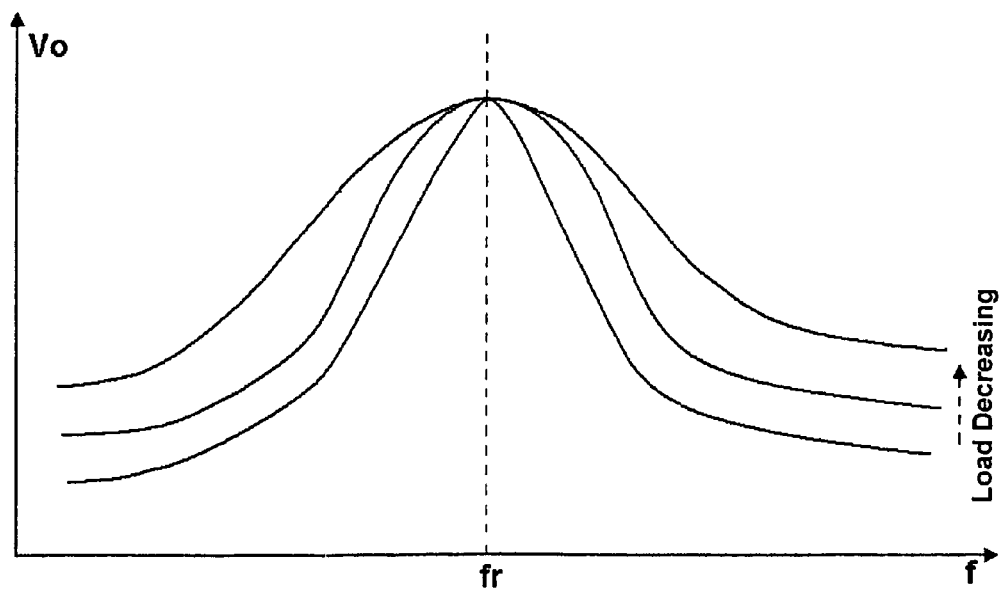
FIG. 2 is an illustrative graph of the characteristics of the circuit of FIG. 1 operating in a PFM control mode.
Figure 3:
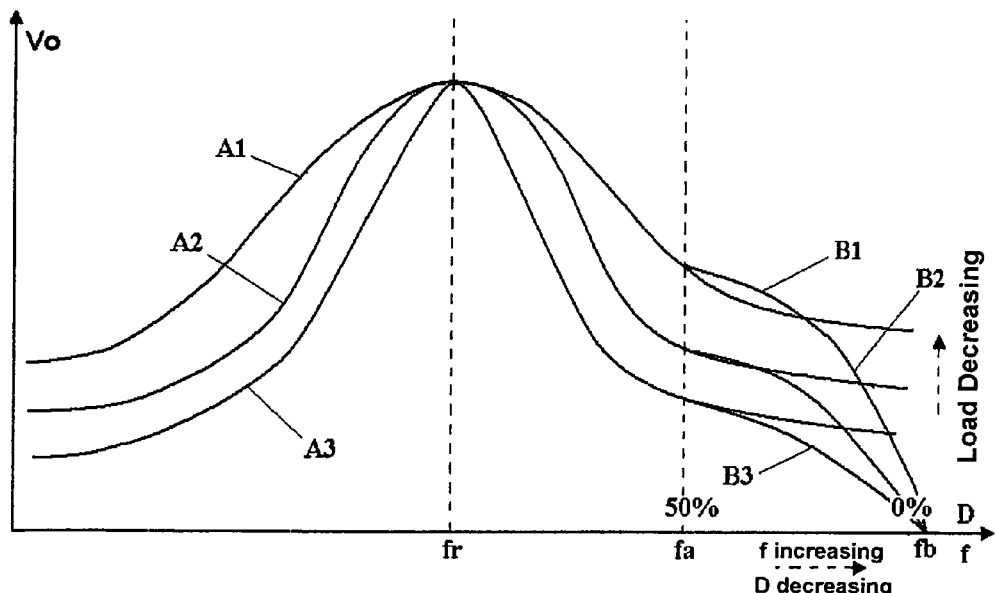
FIG. 3 is a schematic comparison diagram illustrating the output characteristics of the circuit of FIG. 1 which is controlled with the control method according to the present disclosure.

With reference to the half bridge series resonant circuit of FIG. 1 and the curves A1-A3 in FIG. 3, curves A1-A3 show the characteristics of output voltage Vo versus frequency f of the circuit of FIG. 1. The circuit of FIG. 1 is controlled in a PFM control mode in different load conditions for a duty ratio of 50%. As the load decreases, the curve of Vo tends to be flat and is difficult to stabilize with increasing operating frequency. Curves B1, B2, and B3 in FIG. 3 show the characteristics of output voltage Vo versus duty ratio D and frequency f when the switching frequencies of curves A1~A3 are above fa. Above frequency fa, control of the circuit switches from PFM control mode to PWM mode. The circuit thus operates in a combined control mode, respectively, wherein duty ratio D decreases from 50% to 0. It can be seen from curves B1, B2, and B3 that the output voltage begins to attenuate as the control frequency reaches fa, and rapidly attenuates to 0 at the control frequency fb, when PFM+PWM control is used. As compared with a PFM control mode, the output characteristics are greatly improved.

The input switch device of the resonant circuit is controlled with a driving pulse through a drive circuit, and thus the switching from a PFM mode to a PFM+PWM mode is achieved by changing the driving pulse. The switching of the control modes depends directly on the loading conditions, and thus, the driving pulse can be achieved with the following method:

1) Obtaining a feedback signal, the feedback signal resulting from applying a negative feedback compensation to a sampled feedback voltage of the load circuit;
2) Determining the working condition of the load based on the feedback signal by comparing the feedback signal with reference signals. The feedback signal is used to determine a pulse frequency control signal and a pulse width modulation signal. Determining the pulse width modulation signal includes comparing the feedback signal with a predetermined first reference signal after the feedback signal is scaled or subjected to addition or subtraction or otherwise processed. If it is lower than the first reference signal outputting the operated feedback signal directly as the pulse width modulation signal; otherwise, outputting the stable first reference signal as the pulse width modulation signal. In various embodiments, this operation can occur if the feedback signal is greater than the first reference signal. This assumes that the feedback signal is proportional to the voltage of the load, that is, the lower the feedback signal is, the smaller the load. The pulse width modulation signal is thus constant. This corresponds to a simple PFM control mode. The first reference signal is determined according to the electrical characteristics of the load so that the results of the comparison and determination steps that are performed based on the first reference signal reflect correctly whether the load operates in a light load condition. The pulse frequency control signal can be generated in the following two ways. One way is to process the feedback signal with selected operations such as scaling, addition, or subtraction, etc., and then outputting directly the processed signal as the pulse frequency control signal. The pulse frequency control signal would vary in accordance with the feedback signal, and the resonant circuit operates in a PFM control mode. The other way is similar to the above operation for generating the pulse width modulation signal and includes further comparing the result of the above described operations with a predetermined second reference signal. I If the processed feedback signal is higher than the second reference signal, then outputting the operated feedback signal directly as the pulse frequency control signal. Otherwise, outputting the stable second reference signal as the pulse frequency control signal. This assumes that the feedback signal is proportional to the voltage of the load. That is, the lower the feedback signal, the smaller the load. In various embodiments, this operation can occur if the feedback signal is greater than the second reference signal. The pulse frequency control signal is thus constant, which corresponds to a simple PWM control mode. Similarly to the first reference signal, the second reference signal should be determined according to the electrical characteristics of the load. The results of the comparison and determination steps that are performed based on the second reference signal indicate whether or not the load operates in an approximate non-load condition. In order to switch from the PFM control to PFM+PWM control and to PWM control smoothly, if the load is determined to operate in a non-load condition based on the second reference signal, it can be determined based on the first reference signal that the load must operate in a light load condition. This assures that at least one of the pulse width modulation signal and the pulse frequency control signal varies with the feedback signal in any event.
3) Based on the determination result of 2), if the load does not operate in a light load condition, the pulse width modulation signal is stabilized at the first reference signal. The pulse frequency control signal varies with the feedback signal such that under the control of these two signals, the duty ratio of the outputted driving pulse is stable and the frequency of the outputted driving pulse varies with the feedback signal. At this time the resonant circuit operates in the PFM control mode. If the load operates in a light load condition, both of the pulse width modulation signal and the pulse frequency control signal vary with the feedback signal. Under the control of these two signals, both the frequency and the duty ratio of the outputted driving pulse vary with the feedback signal and are commonly regulated. At this time, the resonant circuit operates in a PFM+PWM control mode. If the load operates in a non-load condition, the pulse width modulation signal varies with the feedback signal, and the pulse frequency control signal is stabilized at the second reference signal. Under the control of these two signals, the frequency of the outputted driving pulse is stable, and the duty ratio of the outputted driving pulse varies with the feedback signal. At this time, the resonant circuit operates in a PWM control mode.

Figure 4:
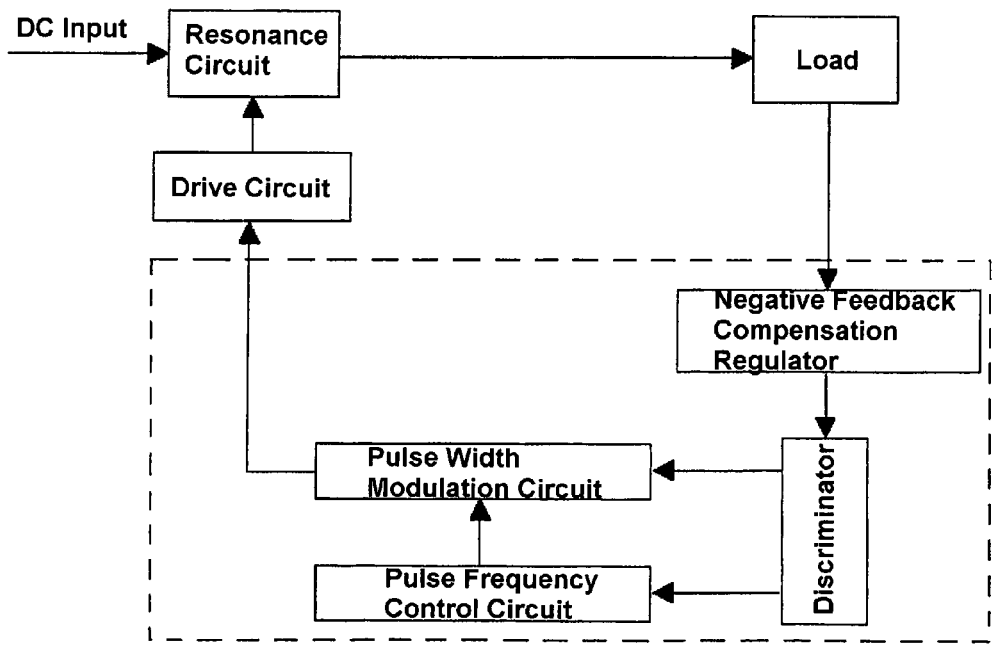
FIG. 4 is a functional block diagram of the DC/DC converter according to the present disclosure.
Figure 5:
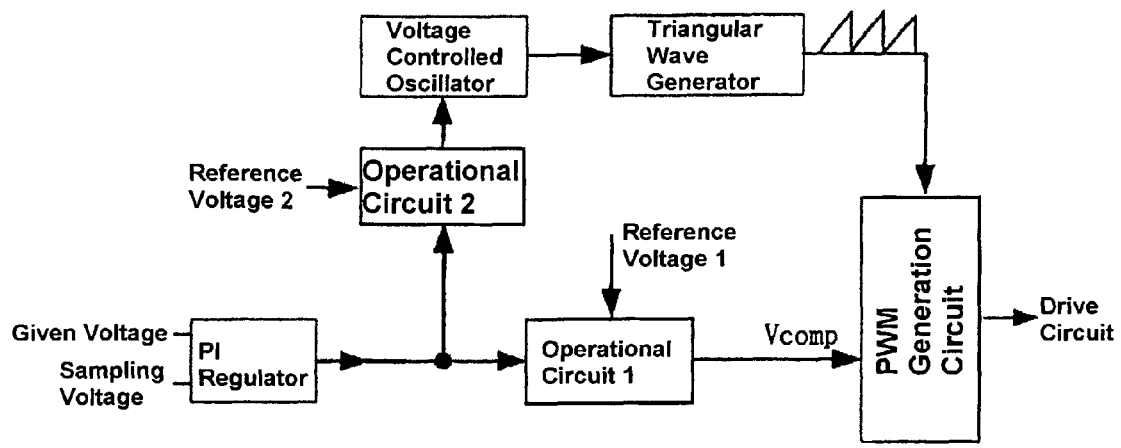
FIG. 5 is a detailed block diagram of the circuit in the dashed block of FIG. 4.

Referring to FIGS. 4 and 5, a resonant DC/DC converter using the aforesaid control method will be described. The resonant DC/DC converter includes a drive circuit and a resonant circuit. An input switch device of the resonant circuit is controlled by the drive circuit according to the input driving pulse The resonant circuit supplies the converted power to the load circuit under the control of the drive circuit. A negative feedback compensation regulator, formed by a PI regulator performs negative feedback compensation operation on a feedback voltage sampled from the load circuit and a reference or given voltage to obtain a feedback signal.

The resonant DC/DC converter further includes a discriminator which includes a first operational circuit and a second operational circuit. The first operational circuit receives a first reference signal or voltage and second operational circuit receives a second reference signal or voltage. The output from the PI regulator is input to first operational circuit. The output from the first operational circuit is input to pulse width modulation generation circuit. The first operational circuit compares first reference signal and the output from the PI regulator. The output from the PI regulator is also applied to second operational circuit. Second operational circuit compares the output from the PI regulator and reference voltage 2 and outputs a signal to the pulse frequency control generation circuit. While both first reference signal and the second reference signal are determined according to the electrical characteristics of the load, the principles of setting these signals apply equally as that of the aforesaid control method, and thus not repeated. When the load operates at or near a non-load state, the discriminator outputs the stable pulse frequency control signal (based on the second reference signal) and pulse width modulation signal that varies in accordance with the feedback signal. When the load operates in a light load state, the discriminator outputs a pulse frequency control signal that varies in accordance with the feedback signal and stable pulse width modulation signal (i.e., first reference signal).

The resonant DC/DC converter further comprises a driving pulse generator which comprises a pulse frequency control circuit and a pulse width modulation circuit. The pulse frequency control circuit comprises a voltage controlled oscillator and a triangular wave generator connected in series. The pulse width modulation circuit is a PWM generating circuit. A pulse frequency control signal is input into the voltage controlled oscillator to control its frequency. The voltage controlled oscillator converts the voltage signal of the pulse frequency control signal to a square wave signal of variable output frequency. The triangular wave generator receives the square wave signal of variable frequency to generate a triangular wave signal with variable frequency outputs to the synchronized terminal of the PWM generating circuit. The PWM generating circuit performs the pulse width modulation based on the input variable frequency triangular wave signal according to the pulse width modulation signal Vcomp input from the compensation terminal, and outputs a driving pulse. When Vcomp is a stable output of first reference signal, the duty ratio of the driving pulse does not vary, while only the frequency varies, providing the PFM control mode. When both Vcomp and the pulse frequency control signal vary, the duty ratio of the driving pulse and the frequency vary simultaneously, providing the PFM+PWM control mode. When the pulse frequency control signal is a stable output of second reference signal, the frequency of the driving pulse does not vary, and only the duty ratio varies, providing the PWM control mode.

Usually, first reference signal has a peak value that is a half of the peak value of the triangular wave. Thus, in the PFM control mode, the duty ratio of the outputted driving pulse is 50%. The PWM only control mode can be removed in accordance with the application requirement, and thus the output frequency, of the driving pulse always depends on the feedback signal, which means that the second reference signal is set as 0.

The modules which effect the function of the pulse frequency control circuit and the pulse width modulation circuit are usually integrated in one chip. There can be various relationships among the circuits as distinguished in accordance with the internal functional structures of the chip. By way of non-limiting example, the pulse width modulation circuit may compare and synthesize the pulse width modulation signal Vcomp and variable frequency triangular wave signal to output the driving pulse. The pulse frequency control circuit and the pulse width modulation circuit are always in series. The pulse frequency control circuit generates the pulse signal and controls its frequency, and the pulse width modulation circuit further determines the duty ratio of the pulse signal.

Figure 6:
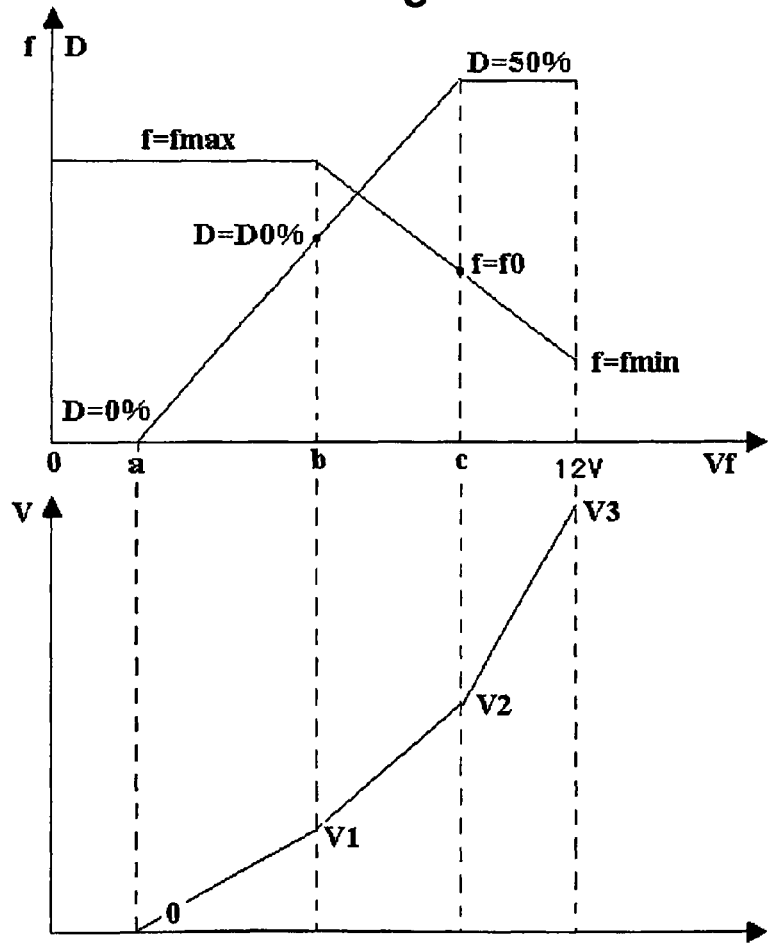
FIG. 6 shows the relationship curves of a feedback signal of the DC/DC converter of FIG. 4 versus frequency and duty ratio.

FIG. 6 shows the functional relationship between the feedback signal Vf output from the negative feedback compensation regulator of the resonant DC/DC converter and the operating frequency f, and between Vf and the output V of the resonant circuit. The horizontal axis represents the feedback signal Vf output from the negative feedback compensation regulator. The maximum output of the negative feedback compensation regulator is 12v. The operation status of the aforesaid resonant DC/DC converter is described as follows:

1. When the feedback signal Vf varies from a to b, the control frequency does not change, f=fmax, the duty ratio varies from 0% to D0%, the output V of the resonant circuit varies from 0 to V1, and the operation mode is PWM control mode.
2. When the feedback signal varies from b to c, the control frequency varies at the same time as the duty ratio changes. The duty ratio varies from D0% to 50% of full pulse width (not including the dead area), causing the continuous increase of the output voltage. At the same time, the control frequency decreases from fmax to f0, resulting in an increase of the output voltage as well. When the loop circuit voltage varies from b to c, the duty ratio reaches the maximum value 50%, and the output voltage increases to V2, and the operation mode is PFM+PWM control mode.

3. When the feedback signal varies from c to 12V, the duty ratio does not change, the control frequency decreases from f0 to fmin, and the output voltage increases continuously. When f=fmin, the output voltage reaches the maximum value V3, and the operation mode is PFM control mode.

It can be seen from FIG. 6 that when the feedback signal increases, the output voltage increases, and thus it can realize closed-loop control. In FIG. 6, c determines the reference signal 1 of the operation circuit 1, c determines the reference signal 2 of the operation circuit 2. When the control system does not include only-PWM control mode, b=0.

Figure 7:
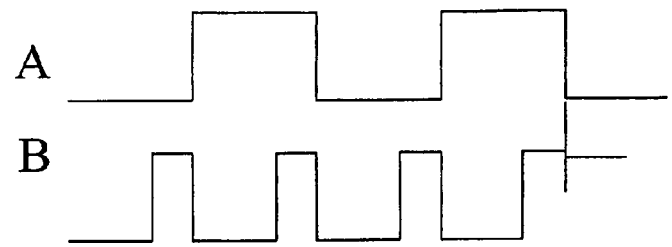
FIG. 7 is a waveform graph of a driving pulse.

FIG. 7 shows the wave shape of the driving pulse in different control modes. Wave A represents the wave shape of a driving pulse with 50% duty ratio under the control of the PFM. Wave B represents the wave shape under the control of the PFM+PWM. The duty ratio and frequency of the driving pulse vary with the output voltage until the duty ratio becomes zero.

Figure 8:
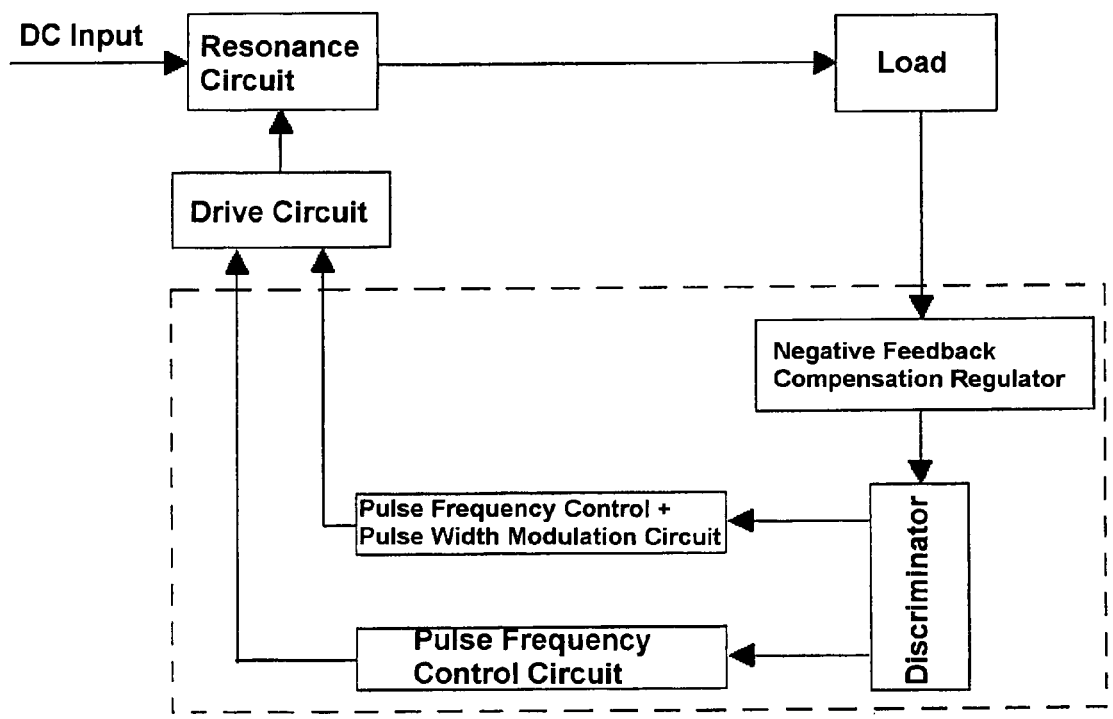
FIG. 8 is another functional block diagram of the DC/DC converter according to the present disclosure.

The aforesaid resonant DC/DC converter is configured so that the pulse frequency control circuit and the pulse width modulation circuit are in series to implement the alternative PFM control and the PFM+PWM control. This can be implemented by using various other embodiments. As shown in FIG. 8, the pulse frequency control circuit, and pulse frequency control plus pulse width modulation circuit are constructed using two driving signal generating circuits independent from each other. The discriminator controls alternatively one of them according the determination of the load to output the driving pulse, to provide the control requirements. I If the discriminator determines that the load operates in a light load state or non-load state, a driving pulse modulation signal is output to the pulse frequency control plus pulse width modulation circuit to control the driving pulse of which the output frequency and duty ratio are both regulated as the feedback signal changes. Otherwise, the pulse frequency control circuit is provided with the driving pulse modulation signal and controlled to output the driving pulse of which the duty ratio is stable and the frequency varies as the feedback signal changes. This alternative embodiment can also achieve the object of the present invention, but more complicated.

In the aforesaid method, the values of the reference signal determine the time at which the control mode is switched. As to the selection of switching points, most resonant circuits rely on the determination of the state of the load (such as in the areas of light load, non-load or nearly non-load) because the controllability of PFM is weaker in those areas. For some circuits, such as, a low voltage, high current circuit, the aforesaid method is not only used in a typical "light load" scenario because in low voltage, high current circuits in such "light load" scenarios cannot completely cover the areas in which the output characteristic varies. The switching points can be determined according to the overall evaluation of the output characteristic of the circuit, i.e., the value of the reference signal, so that the PWM control mode can be used where the PFM controllability becomes weaker to improve or complement the control effect of PFM. Accordingly, the concept of "light load" and so on in the present disclosure should be understood as a load state in which the PFM controllability becomes weaker and should not be limited to the load state of "small current and voltage".

The control mode of the present disclosure is adopted to the circuit using the resonant principles, which includes series resonant, a parallel resonant, a series-parallel resonant circuits, and the like. The circuit topology may be full bridge and/or half bridge, and so on. When the operating frequency of the resonant circuit is lower, the converter operates in the pulse frequency control mode. When the operation frequency is higher, the converter operates in the pulse frequency control plus pulse width modulation mode. This control avoids a high switching frequency in non-load or light load conditions and stabilizes the output voltage in the light load condition. The present disclosure can be implemented with a simple circuitry. The circuits can be smoothly switched between the states in different control modes, so as to ensure the reliability of the circuit.

The pulse frequency control plus pulse width modulation, the pulse frequency control, and the discriminator circuits of the present invention can be implemented by hardware circuits and/or software that be programmed according to the control method of the present invention. This can be understood by those skilled in the art according to the aforesaid descriptions.

What we claim is:

1. A method for controlling a resonant DC/DC converter, which adjusts an output voltage by changing a turn-on frequency of at least one input switch device of a resonant circuit of the converter, comprising:
   adjusting a duty ratio of the at least one input switch device based on a feedback signal from a load circuit wherein the at least one input switch device of the resonant circuit is controlled by a driving pulse through a drive circuit, where acquisition of the driving pulse includes:
   acquiring the feedback signal of the load circuit;
   determining based on the feedback signal whether the load operates at a light load or non-load state; and
   using a pulse signal as the driving pulse of the drive circuit wherein both the frequency and the duty ratio are adjusted in accordance with a change in the feedback signal if the load operates in a range of between the light load and the non-load state so as to have the resonant circuit operate in a combined mode of pulse width modulation (PWM) control and pulse frequency modulation (PFM) control; and
   otherwise using a pulse signal as the driving pulse of the drive circuit wherein the duty ratio is stable and the frequency varies in accordance with the change of the feedback signal, so as to have the resonant circuit operate in a PFM control mode.

2. The method of claim 1, wherein acquiring the feedback signal comprises:
   sampling a feedback voltage from the load circuit; and
   providing a negative feedback compensation operation to the feedback voltage to obtain the feedback signal.

3. The method claim 2, further comprising:
   determining whether the load operates at the light load or non-load state comprises generating a pulse frequency control (PFC) signal and a PWM signal after applying a first process to the feedback signal, the first process including comparing the feedback signal with a first reference signal to determine whether the load is operating at the light load or non-load state, wherein the first reference signal is determined according to the electrical characteristics of the load; and
   using a pulse signal further comprises providing the driving pulse in accordance with both the PFC signal and the PWM when the load operates in the range of between the light load and the non-load state, otherwise, providing the driving pulse wherein the duty ratio is stable and adjusted by the pulse frequency control signal only.

4. The method of claim 3, further comprising a second process comparing the feedback signal with a second reference signal to determine whether or not the load operates in an approximate non-load state, the second reference signal being determined according to the electrical characteristics of the load, the second reference signal satisfies the following conditions, if it is determined that the load operates in an approximate non-load state based on the second reference signal, determining whether the load is operating the light-load or non-load state based on the first reference signal wherein the approximate non-load state can differ from the non-load state; and when using the pulse signal, when it is determined that the load operates in the approximate non-load state, the driving pulse includes a stable frequency and is adjusted by the PWM signal.

5. A resonant DC/DC converter, including a drive circuit and a resonant circuit, the drive circuit controlling at least one input switch device of the resonant circuit in accordance with an input driving pulse, the resonant circuit providing a converted power supply to a load circuit, comprising:

a negative feedback compensation regulator for performing a negative feedback compensation operation on a feedback voltage sampled from the load circuit to obtain a feedback signal;

a discriminator for determining a load state of the load circuit based on the input feedback signal and outputting a driving pulse modulation signal; and a driving pulse generator for modulating and outputting a driving pulse in accordance with the driving pulse modulation signal, wherein if the load operates in a range of between the light load and the non-load state, the frequency and duty ratio of the driving pulse is adjusted in accordance with the feedback signal, otherwise, the duty ratio remains stable and the frequency of the driving pulse varies in accordance with the feedback signal, wherein the driving pulse generator includes a pulse frequency control circuit and a pulse frequency control plus pulse width modulation (PFC+PWM) circuit;

wherein if the discriminator determines that the load operates in the range of between the light load and the non-load state, the PFC+PWM circuit is provided with the driving pulse modulation signal and controlled to output the driving pulse, where both the frequency and the duty ratio vary in accordance with the feedback signal;

otherwise, the pulse frequency control circuit is provided with the driving pulse modulation signal and controlled to output the driving pulse, where the duty ratio is stable and the frequency varies in accordance with the feedback signal.

6. The resonant DC/DC converter of claim 5, wherein the discriminator comprises:

a first circuit; and a second circuit, wherein the first circuit receives a first reference signal, and the driving pulse modulation signal includes a PFC+ PWM signal, wherein the first circuit compares the feedback signal with the first reference signal and outputs the feedback signal as the PWM signal, and wherein the feedback signal is compared with the second reference signal and output as the pulse frequency control signal;

wherein the first reference signal is determined according to the electrical characteristics of the load such that when the load operates in the range of between the light load and the non-load state, the PWM varies in accordance with the feedback signal; otherwise, the PWM signal is stable;

the driving pulse generator includes a pulse frequency control circuit and a pulse width modulation circuit, wherein the pulse frequency control circuit generates a variable frequency pulse having a frequency controlled by a pulse frequency control signal, and the pulse width modulation circuit outputs the driving pulse after pulse width modulating the variable frequency pulse in accordance with a pulse width modulation signal.

7. The resonant DC/DC converter of claim 6, wherein the pulse width modulation circuit outputs the driving pulse after comparing and combining the pulse width modulation signal with the variable frequency pulse.

8. The resonant DC/DC converter of claim 7, wherein the second circuit receives a second reference signal and compares the feedback signal with the second reference signal to generate the pulse frequency control signal, wherein the second reference signal is determined according to the electrical characteristics of the load so that the pulse frequency control signal is stable when the load operates at an approximate non-load state, wherein the approximate non-load state can differ from the non-load state; otherwise, the pulse frequency control signal varies in accordance with the feedback signal; and if it is determined that the load operates at the approximate non-load state, and it must be determined based upon the first reference signal whether the load operates in the range of between the light load and the non-load state.

9. The resonant DC/DC converter of claim 7, wherein the pulse frequency control circuit comprises a voltage controlled oscillator and a triangular wave generator connected in series; wherein the pulse frequency control signal is input to the voltage controlled oscillator to control its oscillating frequency, and the triangular wave generator outputs a variable frequency pulse.

10. The resonant DC/DC converter of claim 6, wherein the variable frequency pulse is input to a synchronized terminal of the pulse width modulation circuit, and the pulse width modulation circuit pulse width modulates the variable frequency pulse in accordance with the pulse width modulation signal, to output the driving pulse.

11. The resonant DC/DC converter of claim 10, wherein the second circuit receives a second reference signal and compares the feedback signal with the second reference signal to generate the pulse frequency control signal, wherein the second reference signal is determined in accordance with the electrical characteristics of the load so that the pulse frequency control signal is stable when the load operates in an approximate non-load state, wherein the approximate non-load state can differ from the non-load state; otherwise, the pulse frequency control signal varies in accordance with the feedback signal; and if it is determined that the load operates in the approximate non-load state, it must be determined based upon the first reference signal whether the load operates at the light load or non-load state.

12. The resonant DC/DC converter of claim 10, wherein the pulse frequency control circuit comprises a voltage controlled oscillator and a triangular wave generator connected in series; wherein the pulse frequency control signal is input to the voltage controlled oscillator to control its oscillating frequency, and the triangular wave generator outputs a variable frequency pulse.

13. The resonant DC/DC converter of claim 6, wherein the second circuit receives a second reference signal and the feedback signal is compared with the second reference signal to generate the pulse frequency control signal, wherein the second reference signal is determined in accordance with the electrical characteristics of the load so that the pulse frequency control signal is stable when the load operates in an approximate non-load state based on the second reference signal, otherwise, the pulse frequency control signal varies in accordance with the feedback signal; and if it is determined based on the second reference signal that the load operates in an approximate non-load state, wherein the approximate non-load state can differ from the non-load state, it must be determined whether the load operates in the range of between the light load and the non-load state based on the first reference signal.

14. The resonant DC/DC converter of claim 6, wherein the pulse frequency control circuit comprises a voltage controlled oscillator and a triangular wave generator connected in series, wherein the pulse frequency control signal is input to the voltage controlled oscillator to control its oscillating frequency, and the triangular wave generator outputs a variable frequency pulse.

* * * * *